United States Patent Office 2,733,182
Patented Jan. 31, 1956

2,733,182

PROCESS AND PRODUCT

Richard L. Dalton and Frank B. Hauserman, Wilmington, Del., assignors to E. I. du Pont de Nemours and Company, Wilmington, Del., a corporation of Delaware No Drawing. Application February 6, 1953, Serial No. 335,591

12 Claims. (Cl. 154—128)

This invention relates to glass fiber-reinforced plastic laminates and is more specifically directed to improved processes for preparing glass fiber-reinforced plastic structures having improved wet strength retention characteristics.

This application is a continuation-in-part of our application Serial No. 273,158, filed February 23, 1952, for "Process and Product" and now abandoned.

Glass fiber-reinforced polyester laminates have suffered from the serious handicap of impairment of strength upon immersion in water or upon exposures to high humidities. It has been the practice heretofore to apply to glass fibers a dilute solution of the Werner type compound in which a trivalent nuclear atom of chromium is coordinated with a carboxylic acido group, the solution being neutralized with sodium formate to a pH of, say, 3.5, drying the coated fibers to remove solvent, and thereafter applying a water-insoluble, heat setting resin. Following such practices the structural strengths of the resulting laminates drop substantially on exposures to high humidity.

We have now found that methacrylato chromic chloride can be used after pH adjustment with a nitrogen-containing base for surface modifying glass fibers. Resin laminates prepared from the surface modified glass fibers possess outstanding strength even upon exposure to moisture, as contrasted to those prepared by processes heretofore mentioned.

According to our invention, methacrylato chromic chloride solution is adjusted with a nitrogen-containing base to an initial pH of at least 4.0 but not greater than 7.0.

Contact is then effected in aqueous medium between glass in the form of fibers, fabric or mat and a neutralized aqueous solution of methacrylato chromic chloride, preferably in the substantial absence of alkali metal or alkaline earth metal salts. The glass thus treated is dried and can then be used in fabricating reinforced plastic structures, which are capable of retaining a substantial percentage of their room temperature properties at high humidity exposures.

By "methacrylato chromic chloride" is meant a Werner complex compound characterized by having therein associated with a trivalent nuclear chromium atom a methacrylic acido group. For convenience, the methacrylic acido group is designated herein as the methacrylato group.

This type of Werner complex compound is fully described in U. S. Patent 2,544,666, which issued to Ralph K. Iler and Max T. Goebel on March 13, 1951.

When it is said that an aqueous solution of methacrylato chromic chloride is neutralized with a nitrogen-containing base, it is meant that the aqueous solution is adjusted to an initial pH of from 4 to 7 with a chemical compound containing nitrogen which, in aqueous solution, yields hydroxyl ions.

By initial pH is meant the pH of the neutralized solution measured at 25° C. immediately after the nitrogen-containing base has been homogeneously distributed throughout the solution.

The pH of the methacrylato chromic chloride solution neutralized with a nitrogen-containing base to an initial value of from 4 to 7 may drift downward as the solution ages, but this does not reduce the effectiveness of the treating solution. For example, a dilute solution of methacrylato chromic chloride containing about 0.12% chromium adjusted to an initial pH of 6.0 measured at a temperature of 25° C. with dilute aqueous ammonia upon aging for a period of 24 hours will have a pH of about 4.3 measured at a temperature of 25° C.

This change in pH upon aging does not impair the effectiveness of the treating solution. Additional neutralizer should not be added as further addition of neutralizer decreases the effectiveness of the treating solution.

The nitrogen-containing base can be an organic amine, a quaternary ammonium compound, or preferably ammonia. In the first two cases, the base will contain organic groups attached to the nitrogen atom. These organic groups may contain one or more carbon atoms and they may be aliphatic, aromatic or heterocyclic. A single organic group may have more than one point of attachment to the nitrogen atom and there may be one, two, or three organic groups on the nitrogen in the case of amines. Quaternary ammonium bases will, of course, have four.

The structure of the organic nitrogen base must be such that each organic substituent on the nitrogen atom contains no carbon atom further removed from the nitrogen than four consecutive carbon atoms. If the organic group is the normal butyl group, for example, the terminal carbon atom is four consecutive carbon atoms removed from the point of attachment.

In the case of a phenyl group the carbon of the benzene ring in the para position is only four carbon atoms removed from the point of attachment because carbons may be counted in either direction around the ring.

The total number of carbon atoms attached to the nitrogen atom of the base exclusively through carbon must not be more than 12.

It will be understood that there may be more than 12 carbon atoms if the carbons are not consecutive but are joined through other atoms such as oxygen. Thus, amines or quaternary ammonium bases substituted with polyethylene oxide groups in which the carbon groups are separated by oxygen atoms according to the arrangement N—(C—C—O)$_x$ are operable.

Among the quaternary ammonium bases which may be used are those in which the substituents on the nitrogen are aliphatic, alicyclic, aromatic or heterocyclic groups. The groups may all be the same or may be different. Specific quaternary ammonium hydroxides which may be used are those in which the substituents are tetramethyl, tetraethyl, tetra-isopropyl, tetra-n-propyl or combinations of the foregoing: dimethyldiallyl, tetraethanol, trimethylethanol, phenyltrimethyl, trimethylcyclohexyl, N-methylpyridinium, N,N-dimethylpiperidinium and N,N-dimethylmorpholinium.

Among the amine bases which may be used are those in which the substituents on the nitrogen are aliphatic, aromatic, alicyclic, and heterocyclic groups. They may be primary, secondary or tertiary. The groups may all be the same or may be different.

Specific amines which may be used in the processes of our invention are those in which the substituents are: mono-, di-, or trimethyl; mono-, di-, or triethyl; mono-, di-, or triisopropyl; mono-, di-, or n-propyl; mono-, di-, or triisobutyl or combinations of the foregoing substituents: diethanolphenyl, monocyclopropyl, mono-, di-, or triethanolamine. Also useful are pyridine, piperidine, morpholine, pyrazine and similar cyclic compounds in which the nitrogen is in the ring.

In operation of processes of the invention, an aqueous treating solution containing methacrylato chromic chloride is first prepared. The aqueous treating solution should contain from about 0.1% to about 1.0% by weight of methacrylato chromic chloride.

A suitable method of preparing such a treating solution consists of adding a stock solution of methacrylato chromic chloride to the required amount of water.

A suitable stock solution of methacrylato chromic chloride is available commercially under the trade name of "Volan" methacrylato chromic chloride. This proprietary product, prepared according to the aforementioned Iler and Goebel patent, contains about 20% methacrylato chromic chloride in which the methacrylate/chromium/chloride mole ratio is 1/2/4 in an isopropanol solution. The chromium content of this product averages about 6.0% by weight.

An aqueous treating solution can be prepared from the above described product by mixing it with water to give a treating solution containing at least 0.5% but not more than 5% by weight of the stock methacrylato chromic solution; that is, to say, 0.1% to 1% by weight methacrylato chromic chloride.

It will be understood, of course, that aqueous treating solutions containing methacrylato chromic chloride can also be prepared by adding to water methacrylato chromic chloride in solvents other than isopropanol. The methacrylato chromic chloride can be dissolved in any volatile, water-miscible, neutral-reacting organic solvent such as, for instance, methanol, acetone or ethanol, and the resulting solution then added to water. The methacrylato chromic chloride may also be added directly to water, although this is not a preferred practice.

The aqueous methacrylato chromic chloride treating solution is then neutralized with a nitrogen-containing base to an initial pH of from 4 to 7 measured at 25° C. and preferably to a pH in the range of from 5 to 6.

We have found that when neutralizing the methacrylato chromic chloride treating solution, it is preferred to employ a dilute aqueous solution of the nitrogen-containing base. With a more concentrated solution, an insoluble precipitate may be formed during the addition of the nitrogen-containing base. A 1% aqueous solution of the nitrogen-containing base is especially preferred.

The nitrogen-containing base can be added at a reasonably fast rate so long as there is sufficient agitation to prevent formation of a permanent precipitate. The neutralized solution should be clear. Turbid solutions should never be used for treating glass fibers.

The neutralized methacrylato chromic chloride treating solution may be applied to glass fabric by any suitable means, such as dipping or spraying, provided the fabric becomes thoroughly saturated.

After the solution has been applied to the fabric, the excess should be removed by squeeze rolls, wiper bars, or other practical means. The wet pickup should be kept to a minimum, consistent with easy processing, in order to hold impurities deposited by the subsequent drying step to a low level.

The concentration of stock methacrylato chromic chloride solution in the treating solution should be adjusted, depending upon the wet pickup, in order to apply the correct amount of complex to the fabric. When a wet pickup of 60 to 70% by weight is obtained with a glass fabric, the optimum concentration of stock methacrylato chromic chloride solution in the treating solution is 2% by weight, that is, 0.4% by weight methacrylato chromic chloride.

If the equipment used in applying the solution to the fabric is such that a higher wet pickup is obtained, then a proportionately lower concentration of stock methacrylato chromic chloride solution should be used.

After the methacrylato chromic chloride treating solution has been applied to the glass fabric and the excess removed, the fabric is then dried to promote bonding of the chromium complex with the glass surface. The treated fabric can be dried on a conventional slasher in an oven, or in any other conventional manner.

For desired results drying should be effected at a temperature of at least 100° C. Additionally, the fabric should be dried thoroughly before subsequent washing. Drying temperatures in the range of from 100 to 170° C. are preferred. Particularly preferred is a drying temperature of about 150° C. Often preferred is a drying temperature in the range of from 130° to 170° C.

It will be further understood that the drying time should be carefully controlled and that the fabric heated only until it is thoroughly dried, but never baked.

Thorough washing of the treated and dried fabric to remove small amounts of water-soluble salts is preferred practice. The presence of water-soluble salts definitely lowers the water-resistance of the bond between the treated fabric and the laminating resin.

Any suitable method may be used for washing the treated fabric. A continuous supply of fresh water is usually required. The methacrylato chromic chloride itself if applied in the manner described above will not be removed by the washing step.

Although washing of the treated and dried fabric is preferred, it is not essential if (1) the concentration of water-soluble salts in the treating solution is very low and (2) not more than 0.05% chromium has been retained by the dry fabric. Ordinarily, the washing step will be found advantageous.

When the dried fabric has been subsequently washed, redrying of the washed fabric is carried out under the drying conditions described above.

The final surface-finished glass fabric should contain from about 0.03 to 0.05% by weight chromium based on the weight of the dried fabric.

It is preferred to carry out the treatment of glass fabric with the neutralized methacrylato chromic chloride solution of our invention in the substantial absence of alkali metal or alkaline earth salts. These metal salts are harmful and should be avoided if possible.

The aqueous medium in which contact is effected between the glass fabric and the methacrylato chromic chloride consists preferably of deionized water. Zeolite-treated water may also be used as well as any "low salt content" water.

By impregnating the treated fabric with a resin such as, for instance, a low pressure polyester resin containing 1% benzoyl peroxide as the curing catalyst, a resin laminate can be fabricated. A sandwich containing, say, 12 layers of resin impregnated fabric can then be formed and cured under pressure.

In addition to the polyester resins, such materials as the phenolics and polyepoxide resins can be used.

A preferred group of resins for use in our invention is the polyglycol esters of maleic or fumaric acid and mixtures of these polyesters with styrene.

When glass fabrics treated with methacrylato chromic chloride solution in the manner described above are incorporated with polyester materials in the manufacture of reinforced plastics and laminates not only is the initial strength of the product extremely good, but marked superiority is also shown when these plastics and laminates are compared with similar products formed with fabrics treated with methacrylato chromic chloride solution, neutralized with the conventional sodium formate. This superiority is especially evident when the laminated articles are tested under relatively high moisture conditions.

The products of this invention are characterized by their high degree of transparency and retention of their initially high flexural strength upon exposure to high humidities or immersion in water. The transparency of the laminated articles of the invention permits one to read thru them with ease.

In order that the invention may be better understood reference should be had to the following illustrative examples:

Example 1

The preparation of methacrylato chromic chloride was carried out as follows:

A solution of a basic trivalent chromium salt having a basicity of 33⅓% was made by reducing the hexavalent chromium compound, chromic oxide ($CrO_3$), using isopropanol as the reducing agent. Thus, a solution of 33.6 parts by weight of chromic oxide in 66.4 parts of 36% hydrochloric acid was slowly added to a refluxing solution of 5.4 parts of hydrochloric acid in 94.6 parts of isopropanol. Analysis of the resulting solution showed 8.35% chloride, and 7.43% chromium. The Cl/Cr ratio was adjusted to 2:1 by the addition of 4.92 parts of hydrochloric acid.

Coordination of methacrylato groups with this basic trivalent chromium salt was effected by adding 4.97 parts of methacrylic acid and 9.26 parts of isopropanol to 85.76 parts of the basic chromic chloride solution. The isopropanol acted as a solvent in this step of the reaction. The solution was heated to reflux and allowed to cool. The resulting methacrylato chromic chloride contained 6% chromium and was soluble in water.

The treating solution for applying the methacrylato chromic chloride to the glass fabric was prepared by mixing 980 grams of water with 20 grams of the stock methacrylato chromic chloride solution described above. The pH of this solution was adjusted to a value of 5.9 with a dilute aqueous solution (1% active ingredient) of piperidine.

A sample of heat cleaned glass fabric, 181 weave (described in U. S. Air Force Specification No. 12051, August 3, 1949), was then immersed in the solution for a period of five minutes. The excess liquid was removed from the fabric by passing it thru a rubber rolled hand wringer to give a 30 per cent wet pick up. The fabric was then dried for a period of 10 minutes in an oven at a temperature of 150° C. The fabric was cooled to room temperature, removed from the oven, and soaked in pure water for a period of five minutes in order to remove harmful salts. After the fabric was allowed to dry, it was suitable for laminate preparation.

The laminates were prepared by impregnating the treated fabric with a low pressure polyester resin containing 1% benzoyl peroxide as the curing catalyst. A sandwich containing twelve layers of resin impregnated fabric was formed and cured under a pressure of fifteen pounds per square inch in a hydraulic press. The platens of the press were heated at such a rate that they reached a temperature of 60° C. after a period of 30 minutes, 80° C. after 45 minutes and 120° C. after 60 minutes. The laminate was then removed from the press.

The laminate was transparent and had a dry flexural strength (determined according to Federal Specification L-P-406a) of 76,700 lbs./sq. in. After the laminate was soaked for a period of three hours in boiling water, it had a flexural strength of 63,600 lbs./sq. in. The completed laminate was 0.137 inch thick and contained 41.4% resin.

Example 2

54 grams of the stock solution (prepared in Example 1) of methacrylato chromic chloride was diluted with 2046 grams of water. Then 600 grams of a 1% aqueous solution of morpholine was added. After the resulting solution was stirred for a period of five minutes, it had a pH of 5.68.

Segments of heat cleaned glass fabric, 181 weave, were immersed in the treating solution for a period of one minute. The excess liquor was removed from the fabric by means of a rubber rolled wringer (wet pick up was 30%). The fabric was dried at a temperature of 150° C. for a period of ten minutes.

The dried fabric was immersed in water for a period of one minute in order to remove harmful salts. The fabric was dried at a temperature of 150° C. for a period of ten minutes.

A twelve ply laminate was then prepared as described in Example 1. The cured laminate had a dry flexural strength of 68,000 lbs./sq. in. After three hours' exposure to boiling water, the laminate had a flexural strength of 59,000 lbs./sq. in. The finished laminate was 0.138 inch thick and had a resin content of 40.4%.

Example 3

To a stainless steel mixing tank containing 25 gallons of water, there was added 3.33 pounds of stock methacrylato chromic chloride solution prepared as described in Example 1. After the stock solution and water were thoroughly mixed, 7.30 lbs. of 1% aqueous ammonia was added with vigorous stirring. The pH of the resulting solution was 5.63, and its temperature was 27° C.

A treating solution was then pumped to the dip tank of a conventional textile slasher. The slasher was equipped with a rubber squeeze roll to regulate wet pickup and seven steam heated drying cans. The fabric, 181 weave, was treated by passing it into the dip tank where the solution was applied (10 seconds' immersion), thru the squeeze rolls to get a wet pick up of 35% and onto the drying cans all heated to a temperature of 200° F. The cloth traveled at three yards per minute thru the treating equipment.

After drying, the fabric was washed to remove harmful salts. The washing was accomplished by passing the fabric thru a slasher which contained pure water in the dip tank. Drying was effected by regulating the first two cans at temperatures of 130° C. and 160° C. respectively, while the remaining five cans were retained at a temperature of 200° C.

Laminates prepared from this fabric according to the procedure in Example 1 were very transparent and had dry flexural strengths of 65,000 lbs./sq. in. After three hours' boiling in water the laminates still retained a flexural strength of 53,100 lbs./sq. in.

Examples 4–14

The procedure for these examples consisted of the steps of placing the water in a suitable container, adding the specified quantity of methacrylato chromic chloride (prepared according to Example 1), stirring the mixture for a period of five minutes, adding a 1% aqueous solution of the specified amine and stirring the resulting solution for a period of six minutes. The recorded pH corresponds to that of the final treating solution.

Pieces of heat cleaned glass fabric, 181 weave, were immersed in the treating solution for a period of five minutes and then passed thru a wringer in order to reduce the wet pick up to 30%. The fabric was then dried for a period of ten minutes at a temperature of 150° C.

After the fabric was dried, the harmful salts were removed therefrom by immersing the fabric in pure water for a period of one minute, removing the excess wash water with a wringer and drying the fabric for a period of ten minutes at a temperature of 150° C.

Laminates were then prepared as described in Example 1 and tested according to Federal Specification L-P-406a.

The wet flexural strength refers to the strength of the test specimen after boiling for three hours in water.

| Example | Amine | Treating Solution | | | | Laminated Properties | | |
|---|---|---|---|---|---|---|---|---|
| | | Grams Water | Grams Methacrylato Chromic Chloride | Grams 1% Amine Solution | pH of Treating Solution | Dry Flexural ×1000 | Wet Flexural ×1000 | Resin Content, Percent |
| 4 | Ammonia | 2,526 | 54 | 120 | 5.30 | 71.6 | 61.3 | 38.8 |
| 5 | Aniline | 582 | 18 | 300 | 5.02 | 46.8 | 42.3 | 40.4 |
| 6 | Diethylene triamine | 796 | 18 | 86 | 5.38 | 69.0 | 51.6 | 36.0 |
| 7 | Dimethylamine | 2,361 | 54 | 285 | 5.60 | 67.8 | 58.6 | 38.5 |
| 8 | N,N-Dimethylethanolamine | 718 | 18 | 164 | 5.40 | 60.4 | 57.1 | 38.0 |
| 9 | N,N-Dimethylethylene diamine | 754 | 18 | 128 | 5.95 | 50.9 | 43.7 | 39.6 |
| 10 | Ethanol amine | 730 | 18 | 152 | 5.65 | 65.9 | 49.5 | 37.5 |
| 11 | Hexamethylene tetramine | 2,466 | 54 | ¹ 180 | 5.30 | 72.3 | 51.1 | 39.7 |
| 12 | Pyridine | 582 | 18 | 300 | 5.45 | 57.5 | 49.0 | 39.6 |
| 13 | Tetramethyl ammonium hydroxide | 682 | 18 | 197 | 5.69 | 63.5 | 57.0 | 37.0 |
| 14 | Trimethylamine | 2,328 | 54 | 318 | 5.40 | 64.3 | 56.3 | 41.0 |

¹ Used 10% Hexamethylene tetramine stock solution.

*Example 15*

Twenty-seven grams of methacrylato chromic chloride prepared according to the method described in Example 1 were added to 2573 grams of water. Then 99 grams of 1% aqueous ammonia were added thereto. The resulting solution was stirred for a period of five minutes. It had a pH of 5.85.

Portions of heat cleaned glass fabric, 181 weave, were immersed in the treating solution for a period of one minute. The excess liquor was removed from the fabric with a rubber roll wringer (wet pick-up was 30%). The fabric was dried for a period of ten minutes at a temperature of 150° C.

Laminates prepared from this fabric according to the directions in Example 1 had dry flexural strengths of 68,200 lbs./sq. in. and wet flexural strengths, after three hours exposure to boiling water, of 56,400 lbs./sq. in.

We claim:

1. A composition comprising an aqueous solution of methacrylato chromic chloride adjusted with a nitrogen-containing base selected from the group consisting of ammonia, and organic amines, in which each organic substituent of the nitrogen atom contains no carbon atom farther removed from the nitrogen than four consecutive carbon atoms and the total number of carbon atoms attached to the nitrogen exclusively through carbon is not more than 12, to a pH within the range of about 4 to about 7.

2. A composition comprising an aqueous solution of methacrylato chromic chloride adjusted with ammonia to a pH within the range of about 4 to about 7.

3. A composition comprising an aqueous solution of methacrylato chromic chloride neutralized with ammonia, the weight ratio of ammonia to methacrylato chromic chloride being in the range of from 0.1 to 0.15.

4. A composition comprising an aqueous solution of methacrylato chromic chloride adjusted with piperidine to a pH within the range of about 4 to about 7.

5. In a process for producing an improved glass fiber-reinforced resin laminate, the steps comprising adjusting an aqueous solution of methacrylato chromic chloride with a nitrogen-containing base selected from the group consisting of ammonia, and organic amines, in which each organic substituent on the nitrogen atom contains no carbon atom farther removed from the nitrogen than four consecutive carbon atoms and the total number of carbon atoms attached to the nitrogen exclusively through carbon is not more than 12, to a pH in the range of about 4 to about 7, effecting contact of glass fibers with said solution and drying the treated glass fibers.

6. In a process for producing an improved glass fiber-reinforced resin laminate, the steps comprising adjusting an aqueous solution of methacrylato chromic chloride with a nitrogen-containing base selected from the group consisting of ammonia, and organic amines, in which each organic substituent on the nitrogen atom contains no carbon atom farther removed from the nitrogen than four consecutive carbon atoms and the total number of carbon atoms attached to the nitrogen exclusively through carbon is not more than 12, to a pH in the range of about 4 to about 7, effecting contact of glass fibers with said solution and drying the treated glass fibers at a temperature of at least 100° C.

7. In a process for producing an improved glass fiber-reinforced resin laminate, the steps comprising adjusting an aqueous solution of methacrylato chromic chloride with a nitrogen-containing base selected from the group consisting of ammonia, and organic amines, in which each organic substituent on the nitrogen atom contains no carbon atom farther removed from the nitrogen than four consecutive carbon atoms and the total number of carbon atoms attached to the nitrogen exclusively through carbon is not more than 12, to a pH in the range of about 4 to about 7, effecting contact of glass fibers with said solution and drying the treated glass fibers, washing the dried, treated glass fibers with water and redrying the washed fibers.

8. In a process for producing an improved glass fiber-reinforced resin laminate, the steps comprising adjusting an aqueous solution of methacrylato chromic chloride with ammonia to a pH in the range of about 4 to about 7, effecting contact of glass fibers with said neutralized solution, drying the treated fibers at a temperature of at least 100° C., washing the dried, treated fibers with water and redrying the washed fibers at a temperature of at least 100° C.

9. In a process for producing an improved glass fiber-reinforced resin laminate, the steps comprising adjusting an aqueous solution containing 0.2% to 0.5% by weight methacrylato chromic chloride with a dilute aqueous ammonia solution to a pH in the range of from about 4 to about 7, effecting contact of said treating solution with glass fibers, drying the treated glass fibers at a temperature of from 100 to 170° C.

10. In a process for producing an improved glass fiber-reinforced resin laminate, the steps comprising adjusting an aqueous solution containing 0.2% to 0.5% by weight methacrylato chromic chloride with a dilute aqueous ammonia solution to a pH in the range of from about 5 to about 6, effecting contact of said treating solution with glass fibers, drying the treated glass fibers at a temperature of from 130 to 170° C., washing the dried, treated glass fibers with water and redrying the treated glass fibers at a temperature in the range of from 130 to 170° C.

11. A transparent laminated article with laminae of glass, the laminae bonded with a polyester resin and methacrylato chromic chloride, said methacrylato chromic chloride having been adjusted with a nitrogen containing base to a pH of from 4 to 7 prior to contact with glass, said base being selected from the group consisting of ammonia, and organic amines, in which each organic substituent on the nitrogen atom contains no carbon atom farther removed from the nitrogen than 4 consecutive carbon atoms and the total number of carbon atoms attached to the nitrogen exclusively through carbon is not more than 12.

12. A transparent laminated article with laminae of glass fabric, the laminae bonded with a polyester resin and methacrylato chromic chloride, said methacrylato chromic chloride having been adjusted with a nitrogen containing base to a pH of from 4 to 7 prior to contact with glass, said base being selected from the group consisting of ammonia, and organic amines, in which each organic substituent on the nitrogen atom contains no carbon atom farther removed from the nitrogen than 5 consecutive carbon atoms and the total number of carbon atoms attached to the nitrogen exclusively through carbon is not more than 12, said laminated article containing between 65 and 55 per cent glass and from 35 to 45 per cent resin.

References Cited in the file of this patent

UNITED STATES PATENTS 2,611,718  Steinman _____ Sept. 23, 1952